Patented Feb. 26, 1946

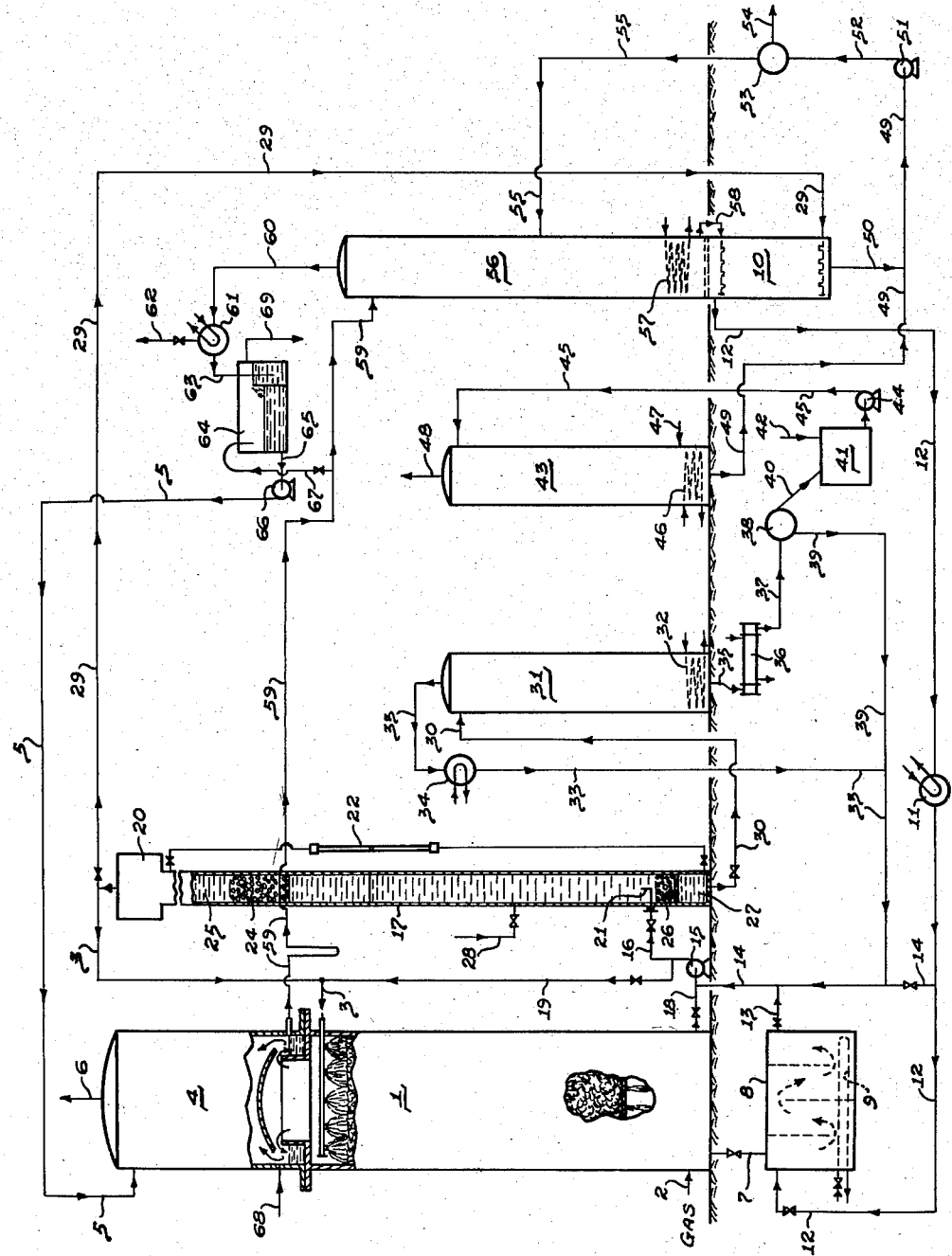

2,395,509

UNITED STATES PATENT OFFICE 2,395,509

GAS PURIFICATION PROCESS

Joseph A. Shaw, Pittsburgh, Pa., assignor, by mesne assignments, to Koppers Company, Incorporated, Pittsburgh, Pa., a corporation of Delaware Application August 17, 1944, Serial No. 549,832

14 Claims. (Cl. 23—2)

The present invention relates to a process for the purification of fluids and especially industrial gases for removal of sulphur.

It is known that suitable absorbents for acidic sulphur-containing constituents in gases can be selected from the organic nitrogen compounds known as the amines, and more especially primary and secondary amines. The more alkaline-reacting of these amines can be utilized in combination with some liquid gas scrubbing medium for absorbing organic sulphur compounds from gases. Usually, the absorbents are regenerated by heating to liberate the absorbed sulphur compounds from them. Often other constituents, especially oxygen-containing compounds, present in said to-be-purified gases bring about decomposition and loss of the employed amines, and what is even more objectionable, the resulting decomposition products are sometimes corrosive to equipment or form gummy deposits therein.

Further, sulphur compounds in the gas may form complex salts with the amines which will be precipitated in the scrubbing medium. In such instances, the precipitated salts, rather than the whole or a portion of the scrubbing medium, are treated for recovery of the amines. Plugging and channeling of scrubbing means, due to deposits therein of said precipitated salts and excessive partial pressure of the absorbed constituents from the said salts in contact with outlet gas are some of the objections to this manner of utilization of the amines.

The amines are usually relatively expensive and commercial success of a process depends largely on maintaining at a low figure the overall loss of amine, for example, vapor loss with purified gas, loss on revivifying scrubbing solution, loss due to conversion of amine to unrecoverable products. For gas scrubbing, the amines are usually dissolved in a liquid diluent, a so-called scrubbing medium, and the lower the amine concentration therein that will efficiently purify a gas the lower will be the above-mentioned vapor loss with outgoing purified gas. In the past, amine concentration and thus vapor loss have been high. Purification of a gas with the desired amine involves the formation of a complex salt, usually a relatively heat-unstable compound, between the amine and the organic sulphur compound or compounds present in the gas. The liquid solvent with the amine has been heat treated to revivify it for further use, or the complex salt has been allowed to precipitate and be separated from the scrubbing medium.

The primary object of the invention is to provide a process of separating sulphur compounds from a gas with an amine absorber for the organic sulphur compounds, such as carbon disulphide, carbonyl sulphide and mercaptans, in which the amount of amine absorbent is only moderately in excess of the amount required for absorbing the sulphur compounds from the gas.

Another object of the invention is to provide a process of removing sulphur compounds from a gas wherein the sulphur compounds may be absorbed in an amine associated with an oil scrubbing medium, the amount of amine being only moderately in excess of that required for complete absorption of sulphur compounds, and revivifying the amino compounds in contact with the oil medium for use in a cyclic process.

A further object of the invention is to provide a process of separating sulphur compounds from a gas with an amino absorbent used in conjunction with an oil absorbing medium from which the sulphur compounds absorbed by the amines may be separated, the oil absorbing medium continuously returned to the process, and the amine associated with sulphur compounds may be separated from the sulphur compounds and continuously returned to the process for reuse.

A further object of invention is to provide process and apparatus for continuously removing constituents from a liquid by means of a therewith immiscible liquid of different gravity and more particularly for continuously revivifying amine-containing purification media employed in a fluid or gas purification process.

Another object of invention is to provide a process and apparatus for effecting efficient removal of sulphur compounds from fluids and especially gases, that permits employment of less basic amines or lower concentrations of more basic amines as absorption media.

Yet another object of invention is to provide a cyclic process embodying improved process and apparatus for employing amines that react with organic sulphur compounds, especially secondary amines in the removal of organic sulphur compounds from gases and for the subsequent recovery of reagent for reuse.

Still another object of invention is to provide an improved cyclic process for employing for the removal of organic sulphur compounds from gases, secondary amines such as piperidine and its homologues, individually or in a mixture of hydrogenated tar bases of wide or narrow boiling range and especially morpholine and its homologues.

The invention has for further objects such other improvements and such other operative advantages or results as may be found to obtain in the processes or apparatus hereinafter described and claimed.

In the accompanying drawing forming part of this specification, there is shown for purposes of exemplification, a preferred form of apparatus in which the invention may be embodied and practised. In connection with the description of apparatus, there will be given an example of the results obtainable in the practice of the invention using morpholine dissolved in wash oil as a scrubbing medium.

The figure shows a diagrammatic flow sheet partly in elevation and partly in vertical section of apparatus for carrying out the improvement provided by the present invention.

In the apparatus shown in the figure, the purification of the gas takes place in scrubber 1, which is the well known packed tower. A stream of coke-oven gas flowing at the rate of 2000 cubic feet per hour, for example, from a light oil recovery plant, enters scrubber 1 through line 2, located near the bottom thereof and passes upwardly countercurrent to a descending flow of scrubbing medium, comprising a wash oil used for light oil recovery from gases, that contains between about 8 and 10 grams per litre of morpholine. This scrubbing medium absorbs and reacts with sulphur compounds in the gas especially with organic sulphur compounds such as carbon disulphide, carbonyl sulphide, carbon hydrogen sulphide, mercaptans, and the like, each 100 cubic feet of gas containing about 8 grains of these organic sulphur compounds. The scrubbing medium enters a scrubber 1 through line 3 at the rate of about ten gallons per 1000 cubic feet of gas.

The gas passing through the packed tower 1 contains traces of morpholine vapors and enters scrubber 4 located thereabove and passes upwardly countercurrent to a descending stream of water solution of morpholine carbonate. As the gas also contains about 1.9% carbon dioxide by volume, the morpholine and carbon dioxide combine to form morpholine carbonate solution. Where carbon dioxide is not present in the gas, or alternatively in place of water, there can be used hydrochloric or sulphuric acid solutions or a solution of a salt of a strong acid and weak base, such as a solution of ammonium sulphate. The water solution containing about 10% morpholine carbonate flowing at the rate of about 0.53 gallon per 1000 cubic feet of gas enters scrubber 4 through line 5 from a later process step. Scrubber 4 is similar in construction to scrubber 1 but usually smaller in size. The purified gas leaves scrubber 4 through line 6 with its organic sulphur content reduced from 8 grains to about 0.68 grain per 100 cubic feet, a removal of about 92%.

For organic sulphur removal from gases the scrubbing medium generally comprises an amine or amines in a solvent diluent or carrier. Primary and secondary amines can be employed and secondary amines are especially useful because of their efficient absorption of sulphur compounds and the ease with which they can be recovered for reuse. Such secondary amines are in addition to morpholine and its homologues, piperidine and its homologues. There can also be employed a hydrogenated tar base fraction prepared from a fraction originally including pyridine, quinoline, isoquinoline, and their homologues and isomers. The hydrogenated portion of a tar base from which any unhydrogenated constituents have been separated may be used in a mixture without any further purification as an efficient absorption agent. The useful hydrogenated tar base fraction can comprise many compounds, which have a wide range of boiling points, for example, piperidines, pipecolines, lupetidines, copellidines, tetramethyl piperidines, tetrahydro-, decahydro-, and hexahydro-derivatives of quinoline and isoquinoline. Among primary amines, monoethanolamine and iso-octylamine have given excellent results.

The solvent diluent or scrubbing medium is a solvent for the amines and for the formed sulphur complexes thereof. The scrubbing medium preferably should have a relatively low vapor pressure, thus preventing undue vapor losses to the purified gas. The scrubbing medium may be water, aliphatic alcohols, ketones and hydrocarbon oils, such as mineral oils and coal tar oils. It is usually preferred to employ the hydrocarbon oils, such as petroleum wash oils or straw oils, because of their availability and because they can serve as absorbents for sulphur compounds. The chemical and physical properties of the hydrocarbon oils vary, and these variations can be utilized to advantage in the present process, for example, the coal tar oils may be cyclic hydrocarbon oils, such as the creosotes which are usually better solvents for amine-sulphur complexes than petroleum oil fractions. Where high concentrations of sulphur compounds are encountered in a gas or where it is preferred to recirculate higher concentrations of said sulphur complex in a scrubbing medium, the coal tar oils rather than the mineral oils would be chosen.

The morpholine-wash oil scrubbing medium reaching the bottom of scrubber 1, passes through a valved line 7 and then flows to and through a baffled delay tank 8. The scrubbing medium contains free morpholine, morpholine carbonate, where a carbon dioxide-containing gas has been scrubbed, and organic sulphur compounds. A portion of the organic sulphur compounds are dissolved by the wash oil, the remainder being combined with morpholine as sulphur complexes thereof. In delay tank 8 opportunity is given for the dissolved sulphur compounds in the wash oil to react with morpholine and form additional morpholine sulphur complex. Completion of the reaction between sulphur compounds and morpholine can depend on such factors as the means for bringing reactants into contact, temperature of the reaction medium, and concentration of the free amine. Progress of the reaction toward completion can be judged by empirical determination of decreasing total vapor pressure of uncombined sulphur compounds in the scrubbing medium. The delay tank 8 preferably is equipped with means for promoting contact of amine with sulphur compounds, such as means for direct agitation, baffles, concentric cylinders, or the like. A steam coil 9 in the delay tank can be employed to control the temperature of scrubbing medium and serve to maintain gas in scrubber 1 above its dew-point.

Fresh morpholine and oil obtained from a contactor 10, in the manner hereinafter described, flows from a condenser 11 of contactor 10 through line 12 to delay tank 8, to build up the scrubbing medium morpholine content, which is being depleted by formation of amine-sulphur complex and other salt and volatilization losses in scrubbers 1 and 4. From delay tank 8 the scrubbing medium flows through line 13, valved line 14, pump 15 and valved line 16 to contactor 17 to be revivified. Alternatively, and as in the present example, the delay tank can be by-passed, the scrubbing medium from scrubber 1 flowing through valved line 18, pump 15 and line 16 to contactor 17. The fresh morpholine and oil then flows from line 12 through valved line 14, pump 15 and line 16 to contactor 17.

The use of a delay tank 8 has a number of advantages. Reaction between amines and, for example, organic sulphur compounds are not instantaneous or even very rapid, especially with amines that are relatively less alkaline in nature. A very important advantage is that concentrations of the amines present in scrubbing solutions can be appreciably reduced. In addition, the loss of amine to the purified gas is greatly reduced due to its decreased concentration in the scrubbing medium. The amine content of the scrubbing medium is only moderately in excess of the amount required for the sulphur removal from the gas. Without increasing capital costs for additional scrubbing means, it has now been found that amines of lesser alkalinity which are excellent absorbers for the more acidic sulphur compounds but are not so active for removal of certain organic sulphur compounds from gases, may be effectively used in combination with the absorbent hydrocarbon oils. This novel increase in the range of available and employable amines is made possible by the use of a delay tank. A further advantage is the more economical use of the more alkaline amines having relatively low boiling points and exhibiting higher partial pressures from solutions thereof.

A scrubbing medium having morpholine salts therein, such as the morpholine sulphur complex and morpholine carbonate, flows from delay tank 8 through lines 13 and 14, or alternatively through line 18, to pump 15 and then through line 16 to contactor 17. Alternatively, a portion of the scrubbing medium without further treatment can be directly recycled from line 16 through valved line 19 and line 3 to scrubber 1. Contactor 17 is a long conduit of relatively small diameter, positioned vertically. For purposes of the present example and for revivifying twenty to thirty gallons of scrubbing medium per hour, the contactor is about forty-eight feet high and constructed of 2-inch pipe, except for a section 20 that is a piece of 8-inch pipe. The spent scrubbing medium from valved line 16 enters the contactor about two feet from the bottom thereof through a spray 21, that can be a simple orifice or any device to create a turbulent flow of liquid upwardly in the form of an unstable emulsion, through a liquid body comprising a 20% sodium hydroxide solution.

The morpholine sulphur complex and other salts are dissolved out of the scrubbing medium by the sodium hydroxide solution to form principally sodium morpholine sulphur complex. At the same time, the available free morpholine is divided or partitioned between scrubbing medium and caustic solution, according to their partition coefficient, thus completing revivification of the scrubbing medium. Division takes place between the caustic solution and scrubbing medium at some point in the contactor. A sightglass 22 is placed adjacent the mid portion of contactor 17 by means of lines connected near the top and bottom of the contactor. The sightglass shows the line of division between the caustic solution and scrubbing medium. Above the 30-foot level in the contactor are five feet of tower filling 24 and a quiescent zone comprising section 25 and enlarged section 26 to destroy the unstable oil-caustic emulsion and produce a revivified oil substantially free of caustic solution. About six inches of tower filling 26 and an 18-inch settling basin 27 are sufficient to destroy any unstable oil-caustic emulsion below spray 21 and produce a caustic solution substantially free of oil. A valved line 28 may be used for admitting caustic solution, or the like, to said contactor or even to admit emulsification or de-emulsification chemicals where they are required.

A major portion of the revivified scrubbing medium, its morpholine content adjusted to between 8 and 10 grams per litre and substantially free of caustic solution, flows from section 20 through a valved line 3 to scrubber 1 for reuse, whereas, a minor portion thereof flows through line 29 to a contactor 10 for further treatment as will be hereinafter described. The caustic solution of sodium morpholine sulphur complex flows from a settling basin 27 through valved line 30 for further treatment. The volume ratio of flow from the contactor is about 45 parts scrubbing medium to 1 part caustic solution.

In contactor 17 sodium hydroxide solution is preferred as being an efficient economical extracting medium for revivification of the scrubbing solution. Water and other extractants can be used. Morpholine is rather soluble in water and to establish a high morpholine content in the scrubbing medium, an abnormally high concentration of morpholine must be carried in the water solution used in the contactor, which is not the case with other extractants such as sodium hydroxide solution. Amine-sulphur complex and other salts thereof can be removed from the scrubbing medium by solutions of other inorganic salts, for example calcium chloride and sodium thiocyanate. Among the organic liquids suitable for revivification are tricresyl phosphate and glycerol. In a co-pending application of the present inventor Serial No. 544,420, filed July 11, 1944, there is described and claimed a process for organic sulphur removal from gases with primary and secondary amines, the scrubbing medium being revivified in a contactor, preferably with water. The contactor 17 also serves to regulate the concentration of morpholine in the revivified scrubbing medium and bring it to the preferred concentration. Caustic soda solution or the like, employed as revivification medium should be immiscible with the solvent employed with the amine, as gas scrubbing medium, in order that substantially complete separation will take place between them.

A water portion having morpholine, sodium morpholine sulphur complex and other salts dissolved therein, continuously flows from basin 27 of contactor 17 through a line 30 to an evaporator 31. Advantage is taken of the fact that sodium morpholine sulphur complex is much more soluble in hot caustic solution than in cold caustic solution. In evaporator 31 the caustic solution from contactor 17 is boiled with indirect heat supplied by coil 32, the resulting water vapor, carrying traces of morpholine, being returned to contactor 17 through line 33, condenser 34, line 14, pump 15 and line 16. The now concentrated caustic solution, in the present example having a concentration of about 23% sodium hydroxide, flows from evaporator 31 through line 35 to a cooler 36 wherein it is cooled to precipitate crystalline, sodium morpholine sulphur can be removed from sump 64 through drain line 69.

In the present example about 50% of a 10% morpholine carbonate solution was continuously recycled to scrubber 4, and for every 1000 cubic feet of gas scrubbed about 1.78 cubic feet of carbon dioxide were vented from the system through vent 62 of condenser 61.

Alternatively, where carbon dioxide is not present in scrubber 4 and an acid solution is used therein to remove morpholine from the purified gas, a portion of the solution in line 59 can be recycled directly to scrubber 4 through line 5 (not shown) and the remainder of the solution in line 59 can be mixed and treated along with the solution leaving desulphurizer 43 in line 49 (not shown).

The hereinabove described novel process for the removal of organic sulphur can likewise be employed for the removal of hydrogen sulphide and the like. The concentration of hydrogen sulphide, and the like, in a to-be-purified gas will be an important factor in determining size of equipment and quantity of chemicals to be employed in the process. The process can also be used to remove sulphur compounds from other fluids, such as hydrocarbon oils, the amines being employed with or without solvent diluents.

Reference is made to my copending application Serial No. 544,420 wherein the claims are directed broadly to the absorption of sulphur compounds in an amine carrier medium to form an amine sulphur complex, the extraction of sulphur-amine complex from the medium with a solvent immiscible in the medium, and the return of the medium to the absorption step. Piperidine is specifically claimed as the amine compound and a hydrocarbon oil is specifically claimed as the carrier medium.

Reference is also made to my copending application Serial No. 549,833 in which sulphur compounds are absorbed from gas with a solution of a reaction product of a weak acid and an amine. After the sulphur has been absorbed in the solution to form an amine sulphur complex the sulphur may be separated from the solution by distillation. Specifically the absorption medium comprises piperidine and phenol in an equimolecular ratio dissolved in a refined creosote oil.

The invention as hereinabove set forth is embodied in particular form and manner but may be variously embodied within the scope of the claims hereinafter made.

I claim:

1. A process for removing sulphur compounds from a fluid, comprising: bringing said fluid into intimate contact with an amine-containing medium to dissolve sulphur compounds from said fluid and form an amine sulphur complex; separating the purified fluid from a medium now comprising amine and amine sulphur complex and extracting the amine sulphur complex with an alkali solution which is immiscible with the medium; and recycling amine-containing medium into contact with to-be-purified fluid.

2. A process for removing sulphur compounds from a fluid, comprising: bringing said fluid into intimate contact with a primary amine-containing medium to dissolve sulphur compounds from said fluid and form an amine sulphur complex; separating the purified fluid from a medium now comprising amine and amine sulphur complex and extracting the amine sulphur complex with an alkali solution which is immiscible with the medium; and recycling amine-containing medium into contact with to-be-purified fluid.

3. A process for removing sulphur compounds from a fluid, comprising: bringing said fluid into intimate contact with a secondary amine-containing medium to dissolve sulphur compounds from said fluid and form an amine sulphur complex; separating the purified fluid from a medium new comprising amine and amine sulphur complex and extracting the amine sulphur complex with an alkali solution; and recycling amine-containing medium into contact with to-be-purified fluid.

4. A process for removing sulphur compounds from a fluid, comprising: bringing said fluid into intimate contact with a morpholine-containing medium to dissolve sulphur compounds from said fluid and form a morpholine sulphur complex; separating the purified fluid from a medium now comprising morpholine and morpholine sulphur complex and extracting the morpholine sulphur complex with a solvent which is immiscible with the medium; and recycling morpholine-containing medium into contact with to-be-purified fluid.

5. A process of removing sulphur compounds from a gas, comprising: scrubbing the gas with morpholine associated with a hydrocarbon oil scrubbing medium to dissolve the sulphur compounds from the gas; separating the scrubbing medium having sulphur compounds absorbed therein from the gas; extracting morpholine sulphur complex with a solvent to separate the absorption menstruum from the morpholine sulphur complex; vaporizing the sulphur compounds to separate them from the morpholine absorbing medium and returning the so revivified morpholine-oil absorbing medium to the scrubbing step in a cyclic process.

6. A process of removing sulphur compounds from a gas, comprising: scrubbing the gas with morpholine in a hydrocarbon oil medium to absorb the sulphur compounds; separating the morpholine scrubbing medium from the gas; separating the sulphur compounds from the morpholine-oil solution with water; distilling the water-treated solution of morpholine to separate sulphur compounds therefrom and returning the morpholine to the scrubbing step in a cyclic process.

7. A cyclic process comprising absorption and revivification steps for removing sulphur compounds from gases, comprising: scrubbing gas with a morpholine-containing medium and absorbing sulphur compounds to form a morpholine sulphur complex thereof; removing scrubbing medium from contact with the gas; extracting morpholine sulphur complex from said medium with caustic alkali solution and adding fresh morpholine-containing medium thereto; returning medium of a predetermined morpholine concentration to the gas-contact stage.

8. A cyclic process comprising absorption and revivification steps, comprising: bringing gas into contact with a secondary amine-containing medium and absorbing from said gas sulphur compounds as amine sulphur complex thereof; removing scrubbing medium from contact with the gas; extracting amine sulphur complex with caustic alkali solution and adding fresh amine-containing medium thereto; returning medium of a predetermined amine concentration to the gas-contact stage.

9. A cyclic process, comprising: bringing a gas into contact with a secondary amine associated with a hydrocarbon oil scrubbing medium to dissolve from said gas sulphur compounds and form an amine sulphur complex; removing scrubbing medium from contact with the gas and allowing sufficient time for dissolved amine and sulphur compounds in the hydrocarbon oil to form additional amine sulphur complex; extracting amine sulphur complex from said medium with a caustic alkali solution and adding fresh secondary amine in hydrocarbon oil thereto; and returning medium of a predetermined amine concentration to the gas-contact stage.

10. A cyclic process comprising: scrubbing a gas with morpholine associated with a hydrocarbon oil scrubbing medium to dissolve from said gas organic sulphur compounds and form a morpholine sulphur complex; removing scrubbing medium from contact with the gas and reacting the dissolved organic sulphur compounds in the hydrocarbon oil with morpholine to increase conversion to said morpholine sulphur complex; extracting said complex from said scrubbing medium by means of a liquid in which the complex is soluble and which is immiscible with said medium; returning so-treated scrubbing medium to said gas-scrubbing step.

11. A cyclic process for removing organic sulphur from gas, comprising: scrubbing the gas with a scrubbing medium containing morpholine to dissolve organic sulphur from said gas and form a morpholine sulphur complex; removing scrubbing medium from contact with said gas and extracting so-separated medium with a solvent for morpholine sulphur complex that is immiscible with scrubbing medium; removing so-treated medium from contact with said solvent and recycling the medium with a predetermined morpholine concentration to the gas scrubbing step; reacting the separated solvent with an acidic-reactant material to release organic sulphur from morpholine sulphur complex by formation of a new morpholine salt with said acidic-reactant material; passing therethrough an inert gas to remove organic sulphur from the morpholine salt; reacting residual morpholine salt with alkali to release free morpholine; separating the free morpholine and recycling it to the scrubbing medium introduced into the gas-scrubbing step.

12. A cyclic process for continuously removing organic sulphur compounds from industrial gases, comprising: scrubbing a said gas with a morpholine-containing scrubbing medium to absorb organic sulphur from said gas and to form morpholine sulphur complex; flowing scrubbing medium out of contact with said gas and into contact with alkali solution to remove morpholine sulphur complex from the scrubbing medium; separating scrubbing medium from alkali solution containing alkali morpholine sulphur complex and adding to the scrubbing medium fresh morpholine recycled thereto from a later step in the process; recycling so-revivified scrubbing medium to the gas-scrubbing step; controllably concentrating alkali solution and thereby crystallizing alkali morpholine sulphur complex therein; separating crystallized alkali morpholine sulphur complex from the concentrated alkali solution; adjusting the concentration of the separated alkali solution to the concentration thereof in the second process step and then recycling the same to said second step; treating separated alkali morpholine sulphur complex crystals with an acidic-reactant material chosen from the group consisting of acids, carbon dioxide, and salts of weak bases and strong acids to form free organic sulphur compounds and morpholine salt of acidic-reactant material; passing an inert gas through the admixture to separate volatile organic sulphur compounds from morpholine salt; treating morpholine salt with alkali solution to produce therein an alkali-acid salt and morpholine; concentrating the alkali solution and contacting therewith a portion of the revivified scrubbing medium to transfer morpholine to the scrubbing medium; recycling alkali solution into contact with further quantities of morpholine salt; and recycling morpholine-enriched scrubbing medium portion to the main body of the scrubbing medium.

13. A cyclic process for continuously removing organic sulphur from gases, comprising: scrubbing a said gas with a morpholine-containing scrubbing medium to absorb organic sulphur from said gas and to form morpholine sulphur complex; flowing so-purified gas into contact with an acid solution to absorb morpholine as morpholine salt; treating scrubbing medium comprising morpholine sulphur complex with alkali solution to remove morpholine sulphur complex from said scrubbing medium; separating scrubbing medium from alkali solution containing alkali morpholine sulphur complex and adding to the purified scrubbing medium morpholine recycled thereto from a later process step; recycling so-revivified scrubbing medium to the first gas-scrubbing step; controllably evaporating the alkali solution and cooling the same to crystallize alkali morpholine sulphur complex therein; separating the crystallized alkali morpholine sulphur complex from alkali solution; adjusting the concentration of the separated alkali solution and then recycling the same into contact with the to-be-revivified scrubbing medium; treating separated alkali morpholine sulphur complex with an acidic-reactant material chosen from the group consisting of acids, carbon dioxide, and salts of weak bases and string acids to form free organic sulphur and morpholine salt of acidic-reactant material; heating the mixture and passing therethrough an inert gas to separate volatile organic sulphur from morpholine salt; admixing the morpholine salt with morpholine salt solution effluent to the second gas-scrubbing step and adding thereto a concentrated alkali solution to produce therein an alkali-acid salt and morpholine; concentrating the alkali solution and contacting therewith a portion of the revivified scrubbing medium to transfer morpholine to the scrubbing medium; recycling alkali solution into contact with further quantities of morpholine salt; and recycling morpholine-enriched scrubbing medium portion to the main body of the scrubbing medium.

14. A cyclic process for removing organic sulphur from gases, comprising: scrubbing a said gas with morpholine in a hydrocarbon oil scrubbing medium to absorb organic sulphur from said gas and to form morpholine sulphur complex; flowing so-purified gas into contact with an acid solution to absorb morpholine salt; flowing morpholine obtained from a later recovery step into contact with the hydrocarbon oil scrubbing medium to permit dissolved organic sulphur compounds therein to react with the morpholine and increase conversion to morpholine sulphur complex; treating the mixture with caustic alkali solution to dissolve morpholine sulphur complex from and adjust the morpholine concentration of the scrubbing medium; separating scrubbing medium from caustic alkali solution containing alkali morpholine sulphur complex and recycling the revivified scrubbing medium to the first gas-scrubbing step; controllably evaporating alkali solution to crystallize alkali morpholine sulphur complex; separating crystallized alkali morpholine sulphur complex from the alkali solution; adjusting the concentration of the alkali solution and then recycling the same into contact with the to-be-revivified scrubbing medium; treating separated crystallized alkali morpholine sulphur complex with an acidic-reactant material to produce free organic sulphur and morpholine salt; passing an inert gas through the admixture to separate volatile organic sulphur compounds from morpholine salt; admixing the morpholine salt with morpholine-salt solution effluent to the second gas-scrubbing step and adding thereto a concentrated alkali solution to produce therein alkali-acid salt and morpholine; concentrating morpholine in alkali solution by evaporation; contacting so-evaporated alkali solution with a portion of scrubbing medium to transfer morpholine to the scrubbing medium; recycling alkali solution into contact with further quantities of morpholine salt; and recycling morpholine-enriched scrubbing medium portion to the main body of the scrubbing medium.

JOSEPH A. SHAW.